United States Patent [19]

Martin

[11] Patent Number: 5,426,590

[45] Date of Patent: Jun. 20, 1995

[54] DEVICE FOR NUMERICAL COMPUTATION OF A SYMMETRICAL COMPONENT OF AN ELECTTICAL QUANTITY OF A THREE-PHASE POWER SYSTEM AND RELAY INCORPORATING IT

[75] Inventor: Eric Martin, Grenoble, France

[73] Assignee: Merlin Gerin, France

[21] Appl. No.: 161,399

[22] Filed: Dec. 6, 1993

[30] Foreign Application Priority Data

Dec. 17, 1992 [FR] France .................................. 9215355

[51] Int. Cl.⁶ .............................................. G01R 29/16
[52] U.S. Cl. ...................................... 364/483; 324/107
[58] Field of Search .......................... 324/107; 364/483

[56] References Cited

FOREIGN PATENT DOCUMENTS 2650711 2/1991 France .

OTHER PUBLICATIONS

Patent Abstracts of Japan, vol. 17, No. 149 (P-1509) Mar. 24, 1993.

*Primary Examiner*—Edward R. Cosimano
*Attorney, Agent, or Firm*—Parkhurst, Wendel & Rossi

[57] ABSTRACT

The computing device comprises non-recursive, digital filters, with finite impulse response, computing, from samples taken over a period of the power system, for at least two distinct phases, two components with a phase difference of 90° between them and representative of the quantity involved in the phase involved. A matrix computation using a two-dimensional rotation matrix enables the components with a 90° phase difference of the inverse component to be deduced therefrom.

6 Claims, 2 Drawing Sheets

DEVICE FOR NUMERICAL COMPUTATION OF A SYMMETRICAL COMPONENT OF AN ELECTRICAL QUANTITY OF A THREE-PHASE POWER SYSTEM AND RELAY INCORPORATING IT

BACKGROUND OF THE INVENTION

The invention relates to a device for numerical computation of a symmetrical component of an electrical quantity, current or voltage, of a three-phase power system, comprising means for measuring said quantity in at least two phases of the power system, means for sampling and for analog-to-digital conversion connected to the output of the measuring means, and means for determining said symmetrical component connected to the output of the conversion means.

It is known that an unbalanced three-phase system of sinusoidal quantities, voltages or currents, can be considered as being the superposition of three symmetrical balanced systems able respectively to be represented by the direct, inverse and zero sequence components of the quantity involved. Some protection relays, connected to a three-phase electrical power system, take account of certain of the symmetrical components of the power system voltages or currents, notably the inverse voltage or current.

In state-of-the-art devices, the values representative of the inverse component are generally computed analogically. In patent application FR-2,650,711, a shunt circuit breaker comprises a microprocessor generating the inverse voltage component from dephased voltage samples measured at a predetermined time on a first phase of the power system and respectively 13.3 ms and 6.6 ms later on the other two phases of the power system, in the case of a 50 Hz frequency power system. This method has the shortcoming of giving a wrong inverse voltage value if the phase voltage modules vary in module and in phase during the time required for computing.

SUMMARY OF THE INVENTION

The object of the invention is to provide a device for digital calculation of a symmetrical component of an electrical quantity of a three-phase power system which does not present the shortcomings of state-of-the-art devices.

According to the invention, this object is achieved by the fact that said determining means comprise digital filtering means computing, for each of said phases, from a plurality of digital samples representative of said quantity on said phase during a period of the power system, two components with a phase difference of 90° between them and representative of said quantity, and matrix computing means, comprising at least one two-dimensional rotation matrix and connected to the digital filtering means.

The invention also relates to a protection relay comprising a computing device of this kind.

BRIEF DESCRIPTION OF THE DRAWINGS

Other advantages and features will become more clearly apparent from the following description of an illustrative embodiment of the invention given as a non-restrictive example only and represented the accompanying drawings in which.

DETAILED DESCRIPTION OF THE PREFERRED EMBODIMENT

Figure 1:
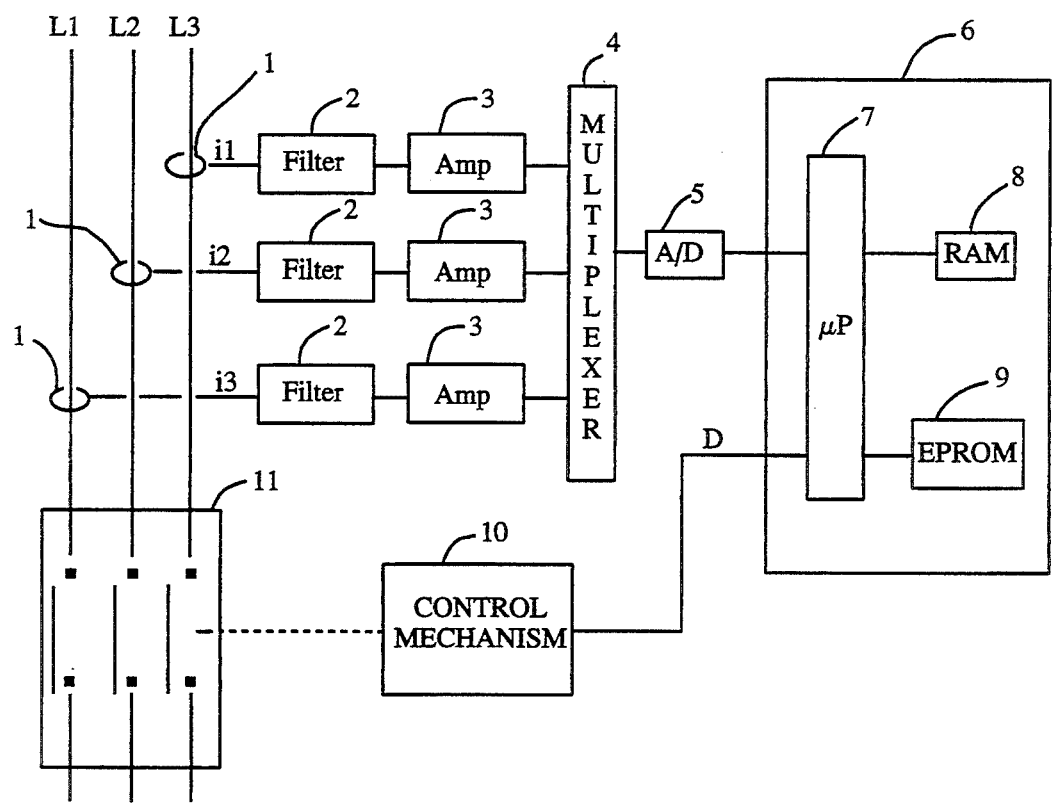
FIG. 1 illustrates, in block diagram form, a digital relay in which the invention can be implemented.

It is known that the inverse current component $Ii$ can be obtained from the 3 vectors $I1$, $I2$, $I3$ representative of the three phase currents of a three-phase power system by the equation:

$$Ii = (I1 + a^2 I2 + aI3)/3 \qquad \text{(Eq. 1)}$$

in which a is a rotation operator defined by:

$$a = \exp j2\pi/3 \qquad \text{(Eq. 2)}$$

The currents $Ii$, $I1$, $I2$ and $I3$ are computed over a power system period and are representative of the corresponding currents at a predetermined time. The values $I1$, $I2$ or $I3$ of the phase currents are obtained from a plurality of successive samples, respectively $ie1$, $ie2$ or $ie3$, obtained from measuring the corresponding current $i1$, $i2$ or $i3$ during a period. The samples ie representative of a current $I$ to be determined are applied to the input of two non-recursive finite impulse response digital filters whose coefficients are determined so as to supply, over a period, two components X and Y with a phase difference of 90° between them. The current I can thus be represented by its two components X and Y, such that:

$$I^2 = X^2 + Y^2 \qquad \text{(Eq. 3)}$$

The use of digital filters taking account of the samples obtained over an observation period whose duration corresponds to that of a power system period enables harmonics problems to be overcome.

Computation of the components can be performed at each sampling period, the new values of the components X and Y being representative of the current during the elapsed power system period. To limit the computing time required, it is possible not to compute a new value of the components X and Y at each new sample, but after a preset number of samples. As an example, in a preferred embodiment, the currents are sampled 12 times per period and computation of the components X and Y is performed every 4 samples, taking account of the last 12 samples. This enables an acceptable compromise to be achieved between accuracy and required computing capacity, i.e. processing speed.

The components X1, Y1, X2, Y2 and X3, Y3 having being computed, equation Eq. 1 can be used to compute the components Xi and Yi of the inverse current Ii, in matrix form, according to the following equation Eq. 4:

$$3\begin{bmatrix} Xi \\ Yi \end{bmatrix} = \begin{bmatrix} X1 \\ Y1 \end{bmatrix} + \begin{bmatrix} \cos(4\pi/3) & -\sin(4\pi/3) \\ \sin(4\pi/3) & \cos(4\pi/3) \end{bmatrix}\begin{bmatrix} X2 \\ Y2 \end{bmatrix} + \begin{bmatrix} \cos(2\pi/3) & -\sin(2\pi/3) \\ \sin(2\pi/3) & \cos(2\pi/3) \end{bmatrix}\begin{bmatrix} X3 \\ Y3 \end{bmatrix}$$

A matrix calculation involves making the components of I2 perform a matrix rotation of 240° and the components of I3 perform a matrix rotation of 120°, and then making the vector sum of the components thus obtained and of the components of I1. Ii is then computed from these components Xi and Yi by means of equation Eq. 3.

According to a preferred embodiment, equation Eq. 1 is set out in a form such that a single two-dimensional rotation matrix has to be used. We know in fact that:

$$a^2 + a + 1 = 0 \quad \text{(Eq. 5)}$$

The equation Eq. 1 can therefore be written $$3Ii = I1 + a^2 I2 + a I3 \quad \text{(Eq. 6)}$$

$$3Ii = I1 + a^2 I2 + I3(-1 - a^2) \quad \text{(Eq. 7)}$$

$$3Ii = I1 - I3 + a^2(I2 - I3) \quad \text{(Eq. 8)}$$

The matrix calculation of the components Xi and Yi can then be written:

$$3\begin{bmatrix} Xi \\ Yi \end{bmatrix} = \begin{bmatrix} X1 - X3 \\ Y1 - Y3 \end{bmatrix} + \begin{bmatrix} \cos(4\pi/3) & -\sin(4\pi/3) \\ \sin(4\pi/3) & \cos(4\pi/3) \end{bmatrix} \begin{bmatrix} X2 - X3 \\ Y2 - Y3 \end{bmatrix} \quad \text{(Eq. 9)}$$

This computation is quicker as it only uses one two-dimensional rotation matrix.

Figure 2:
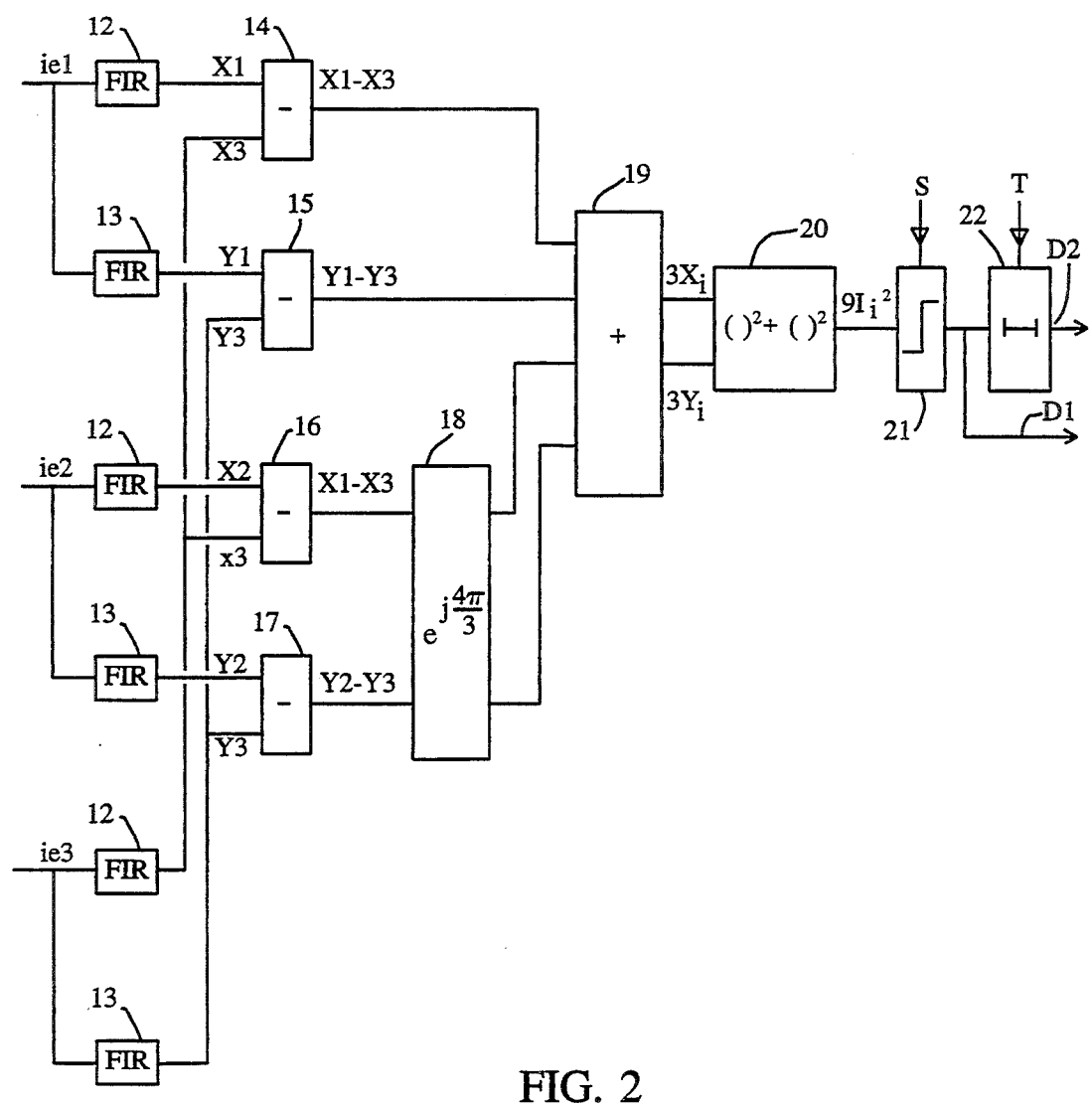
Figure 2 represents in greater detail the functions performed by the microprocessor of the relay of FIG. 1.

FIGS. 1 and 2 illustrate a particular embodiment of a relay implementing the invention.

In FIG. 1, current sensors 1 enable the currents i1, i2 and i3 flowing in phase conductors L1, L2 and L3 of a three-phase electrical power system to be measured.

The output signals from a current sensor 1 are applied to the input of an associated anti-aliasing filter 2 and are then, after possible amplification in an amplifier 3, applied to the input of a multiplexer 4.

The output of the multiplexer 4 is connected to the input of a sampling and analog-to-digital conversion circuit 5 which applies to the input of an electronic processing circuit 6 digital values representative of successive samples ie1, ie2 and ie3 of the measured currents. In FIG. 1, only the components of the circuit 6 indispensable for understanding have been represented, i.e. a microprocessor 7, connected to a RAM 8 and a ROM 9, for example of the EPROM type.

The microprocessor 7 performs digital filtering, for each of the phase currents, enabling the corresponding components X and Y to be obtained and deduces therefrom the corresponding values of Xi and Yi, and then the value of the inverse current. This value is then compared with a preset threshold and if it exceeds this threshold the microprocessor supplies, instantaneously or after a time delay, a tripping signal D to a control device 10 of the mechanism of a circuit breaker 11, which then interrupts the current flow in the electrical power system.

FIG. 2 illustrates in greater detail the various functions performed by the microprocessor in the case where it uses the equation Eq. 9.

The microprocessor performs (12, 13) double digital filtering of the samples associated with each of the phases, so as to compute the values X1, Y1; X2, Y2 and X3, Y3, from the samples ie1, ie2 and ie3 taken over a power system period. It then computes the differences X1-X3 at 14, Y1-Y3 at 15, X2-X3 at 16 and Y2-Y3 at 17. It then, at 18, makes the vectors of the components X2-X3 and Y2-Y3 undergo a rotation of 240°. Then the microprocessor computes, at 19, the matrix sum of the values obtained on output of 14, 15 and 18 so as to obtain the values 3Xi and 3Yi. Computation of Ii is performed at 20 by squaring and summing the previously obtained values 3Xi and 3Yi. The value thus obtained, $9Ii^2$, is then compared at 21 with a preset threshold S whose value has previously been stored in the processing circuit 6. If the value $9Ii^2$, representative of the inverse current Ii is greater than the threshold S, the microprocessor supplies either an instantaneous tripping signal D1 or, at 22, a tripping signal D2 after an adjustable, preset time delay T. The time delay may be a constant time delay or a function of the current amplitude.

The invention is not limited to the embodiment represented above. In particular, it applies not only to computation of the inverse component but also to computation of the direct component of three-phase current or voltage. The direct current component Id is in fact given by the equation:

$$Id = (I1 + a I2 + a^2 I3)/3 \quad \text{(Eq. 10)}$$

This equation can be used as such to compute, with two rotation matrices, the direct current components Xd and Yd from the phase current components. It can, like the equation Eq. 1, be simplified so as to comprise a single rotation matrix.

In the alternative embodiments described above, the symmetrical components are computed from the current or voltage measurements on the three phases of the power system. In the absence of an earth fault, it is possible to compute the symmetrical component from two phases only. Indeed, in this case I1+I2+I3=0 and it can be shown that the equation Eq. 1 can be written:

$$\exp(-j\pi/6) Ii = (Ii - a^2 I3)/\sqrt{3} \quad \text{(Eq. 11)}$$

The equation Eq. 11 can be used by the microprocessor to compute the components Xi and Yi of Ii from the components of I1 and I3, with a single rotation matrix.

It may be advantageous to express the value Ii in another form in this case, so as to obtain processing of the same type as that performed with three phases. Indeed, the equation Eq. 8 can, when I1+I2+I3=0, be written:

$$3Ii = I1 - I3 + a^2(-I1 - I3 - I3) \quad \text{(Eq. 12)}$$

$$3Ii = I1 - I3 + a^2(-I1 - 2I3) \quad \text{(Eq. 13)}$$

$$\text{or } 3Ii = I1 - I3 - a^2(I1 + 2I3) \quad \text{(Eq. 14)}$$

or in matrix form $$3\begin{bmatrix} Xi \\ Yi \end{bmatrix} = \begin{bmatrix} X1 - X3 \\ Y1 - Y3 \end{bmatrix} + \begin{bmatrix} \cos(4/3) & -\sin(4/3) \\ \sin(4/3) & \cos(4/3) \end{bmatrix} \begin{bmatrix} -X1 - 2X3 \\ -Y1 - 2Y3 \end{bmatrix} \quad \text{(Eq. 15)}$$

The functions to be performed by the microprocessor are then practically the same as in the embodiment illustrated in FIG. 2, only the functions 16 and 17 having to be modified accordingly so as to supply:

−X1 −2X3 and −Y1 −2Y3 on the input of function 18.

The computing device described above can be applied to 50 or 60 Hz power systems, in both medium voltage and low voltage. The observation period of the digital filters must naturally be adapted to suit the power system period.

A computing device of this kind is particularly designed to be used in protection relays. As an example, a relay of this kind can be designed for protection of a machine, motor or alternator, against possible power system unbalances, phase inversions and breaks. For this the significant presence of an inverse current is detected which causes the machine rotor temperature to rise abnormally. The relay computes the inverse component Ii of the current from the current measured in three phases (equations Eq. 1 or Eq. 8) or in two phases in the absence of an earth fault (equations Eq. 11 or Eq. 13 or Eq. 14) and compares it with a preset threshold. This protection has the advantage of being sensitive to the fundamental of the signal, which makes it insensitive to a possible DC component and to harmonics.

The use of a dependent time delay prevents nuisance tripping which could be caused by unbalances linked with the current transformers during startup or acceleration periods while providing a sufficient level of protection.

What is claimed is:

1. A protection relay device comprising:
processing means for determining a symmetrical component of an electrical quantity, current or voltage, of a three-phase power system; means for comparing said symmetrical component with a preset threshold; and means for producing a tripping signal, with or without a time delay, when said symmetrical component exceeds the reset threshold;
wherein said processing means comprises measuring means for measuring said quantity in at least two phases of the power system; sampling and conversion means for sampling and for performing an analog-to-digital conversion connected to an output of the measuring means; and determining means for determining said symmetrical component connected to the output of the sampling and conversion means; and
wherein said determining means comprises digital filtering means for computing, for each of said phases, from a plurality of digital samples representative of said quantity on said phase during a period of the power system, two components with a phase difference of 90° between them and representative of said quantity, and matrix computing means, comprising at least one two-dimensional rotation matrix, connected to the digital filtering means.

2. The device according to claim 1, wherein the digital filtering means comprise two non-recursive finite impulse response filters.

3. The device according to claim 1, wherein the symmetrical component is the direct component of said quantity.

4. The device according to claim 1, wherein the symmetrical component is the inverse component of said quantity.

5. The device according to claim 4, wherein the means for determining compute the components Xi and Yi, with a phase difference of 90°, of the inverse component of said quantity, according to the following equation:

$$3\begin{bmatrix} Xi \\ Yi \end{bmatrix} = \begin{bmatrix} X1 - X3 \\ Y1 - Y3 \end{bmatrix} + \begin{bmatrix} \cos(4\pi/3) & -\sin(4\pi/3) \\ \sin(4\pi/3) & \cos(4\pi/3) \end{bmatrix} \begin{bmatrix} X2 - X3 \\ Y2 - Y3 \end{bmatrix}$$

in which X1 and Y1, X2 and Y2, X3 and Y3 are respectively the components with a phase difference of 90° of said quantity associated with the three phases.

6. The device according to claim 4, wherein the means for determining compute the components Xi and Yi, with a phase difference of 90°, of the inverse component of said quantity, according to the following equation:

$$3\begin{bmatrix} Xi \\ Yi \end{bmatrix} = \begin{bmatrix} X1 - X3 \\ Y1 - Y3 \end{bmatrix} + \begin{bmatrix} \cos(4\pi/3) & -\sin(4\pi/3) \\ \sin(4\pi/3) & \cos(4\pi/3) \end{bmatrix} \begin{bmatrix} -X1 - 2X3 \\ -Y1 - 2Y3 \end{bmatrix}$$

in which X1, Y1 and X3, Y3 are respectively the components with a 90° phase difference of said quantity associated with a first and a third phase.

* * * * *

UNITED STATES PATENT AND TRADEMARK OFFICE
CERTIFICATE OF CORRECTION

PATENT NO. : 5,426,590
DATED : June 20, 1995
INVENTOR(S) : Eric MARTIN

It is certified that error appears in the above-indentified patent and that said Letters Patent is hereby corrected as shown below:

On the title page: Item [54] and Column 1, line 3, in the title, correct the spelling of "ELECTTICAL" to --ELECTRICAL--.

Signed and Sealed this

Eighth Day of August, 1995

Attest:

BRUCE LEHMAN

Attesting Officer

Commissioner of Patents and Trademarks